United States Patent
Laur et al.

(10) Patent No.: US 9,618,936 B2
(45) Date of Patent: Apr. 11, 2017

(54) AUTOMATED VEHICLE CONTROL-RULE SELECTION BASED ON OPERATOR STATE-OF-AWARENESS

(71) Applicant: DELPHI TECHNOLOGIES, INC., Troy, MI (US)

(72) Inventors: Michael H. Laur, Mission Viejo, CA (US); Indu Vijayan, Sunnyvale, CA (US); Serge Lambermont, Maastricht (NL); Ludong Sun, Stanford, CA (US); Ryan S. Middleton, Mountain View, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/730,586

(22) Filed: Jun. 4, 2015

(65) Prior Publication Data

US 2016/0357185 A1    Dec. 8, 2016

(51) Int. Cl.
| | |
|---|---|
| *B60K 28/00* | (2006.01) |
| *G05D 1/00* | (2006.01) |
| *G05D 1/02* | (2006.01) |
| *B60K 28/06* | (2006.01) |

(52) U.S. Cl.
CPC ........... *G05D 1/0055* (2013.01); *B60K 28/06* (2013.01); *G05D 1/0212* (2013.01)

(58) Field of Classification Search
CPC combination set(s) only.
See application file for complete search history.

(56) References Cited

U.S. PATENT DOCUMENTS

| | | | |
|---|---|---|---|
| 8,618,922 B2 | 12/2013 | Debouk et al. | |
| 8,823,530 B2 | 9/2014 | Green et al. | |
| 8,874,301 B1 | 10/2014 | Rao et al. | |
| 2010/0256836 A1 | 10/2010 | Mudalige | |
| 2011/0255741 A1* | 10/2011 | Jung | G06K 9/00369 |
| | | | 382/103 |
| 2012/0212353 A1 | 8/2012 | Fung et al. | |
| 2013/0245886 A1* | 9/2013 | Fung | B60K 28/06 |
| | | | 701/36 |
| 2014/0244096 A1 | 8/2014 | An et al. | |
| 2015/0070160 A1 | 3/2015 | Davidsson et al. | |
| 2016/0001781 A1* | 1/2016 | Fung | G06F 19/345 |
| | | | 701/36 |

(Continued)

FOREIGN PATENT DOCUMENTS

| | | |
|---|---|---|
| JP | 07-195956 A | 8/1995 |
| WO | 2014-130460 A2 | 8/2014 |

*Primary Examiner* — Yonel Beaulieu
(74) *Attorney, Agent, or Firm* — Lawrence D. Hazelton

(57) ABSTRACT

A system for automated operation of a host-vehicle includes a sensor, a data-source, and a controller. The sensor is installed in a host-vehicle. The sensor is operable to determine a state-of-awareness of an operator of the host-vehicle. The data-source provides route-data used for automated operation of the host-vehicle. The route-data includes a map and a control-rule for navigating the map. The controller is in communication with the sensor and the data-source. The controller is configured to operate the host-vehicle during automated operation of the host-vehicle in accordance with the route-data. The controller is also configured to modify the control-rule based on the state-of-awareness of the operator.

6 Claims, 3 Drawing Sheets

(56) References Cited

U.S. PATENT DOCUMENTS

2016/0107653 A1* 4/2016 Fung ................. B60W 40/09
　　　　　　　　　　　　　　　　　　　　701/41
2016/0152233 A1* 6/2016 Fung ................. B60K 28/06
　　　　　　　　　　　　　　　　　　　　701/41

* cited by examiner

AUTOMATED VEHICLE CONTROL-RULE SELECTION BASED ON OPERATOR STATE-OF-AWARENESS

TECHNICAL FIELD OF INVENTION

This disclosure generally relates to automated vehicles, and more particularly relates to system that modifies a vehicle control-rule based on a state-of-awareness of the operator.

BACKGROUND OF INVENTION

It is envisioned that at some time in the future autonomous or automated operation of vehicles will be such that no interaction from an operator is necessary for the vehicle to navigate to a destination. However, until that time it is expected that situations will arise when it is necessary for an operator to take full or partial manual control of a vehicle in order to navigate an unexpected traffic scenario. It is also envisioned that because an operator may not be engaged with or attentive to the operation of the vehicle during automated, the operator may intentionally or unintentionally fall asleep, or decide to read a book. If the operator is asleep or reading a book, i.e. is not attentive to the operation of the vehicle, a smoother ride may be desired and additional time may be required for the operator to transition from sleeping or reading to being attentive to the operation of the vehicle.

SUMMARY OF THE INVENTION

In accordance with one embodiment, a system for automated operation of a host-vehicle is provided. The system includes a sensor, a data-source, and a controller. The sensor is installed in a host-vehicle. The sensor is operable to determine a state-of-awareness of an operator of the host-vehicle. The data-source provides route-data used for automated operation of the host-vehicle. The route-data includes a map and a control-rule for navigating the map. The controller is in communication with the sensor and the data-source. The controller is configured to operate the host-vehicle during automated operation of the host-vehicle in accordance with the route-data. The controller is also configured to modify the control-rule based on the state-of-awareness of the operator.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
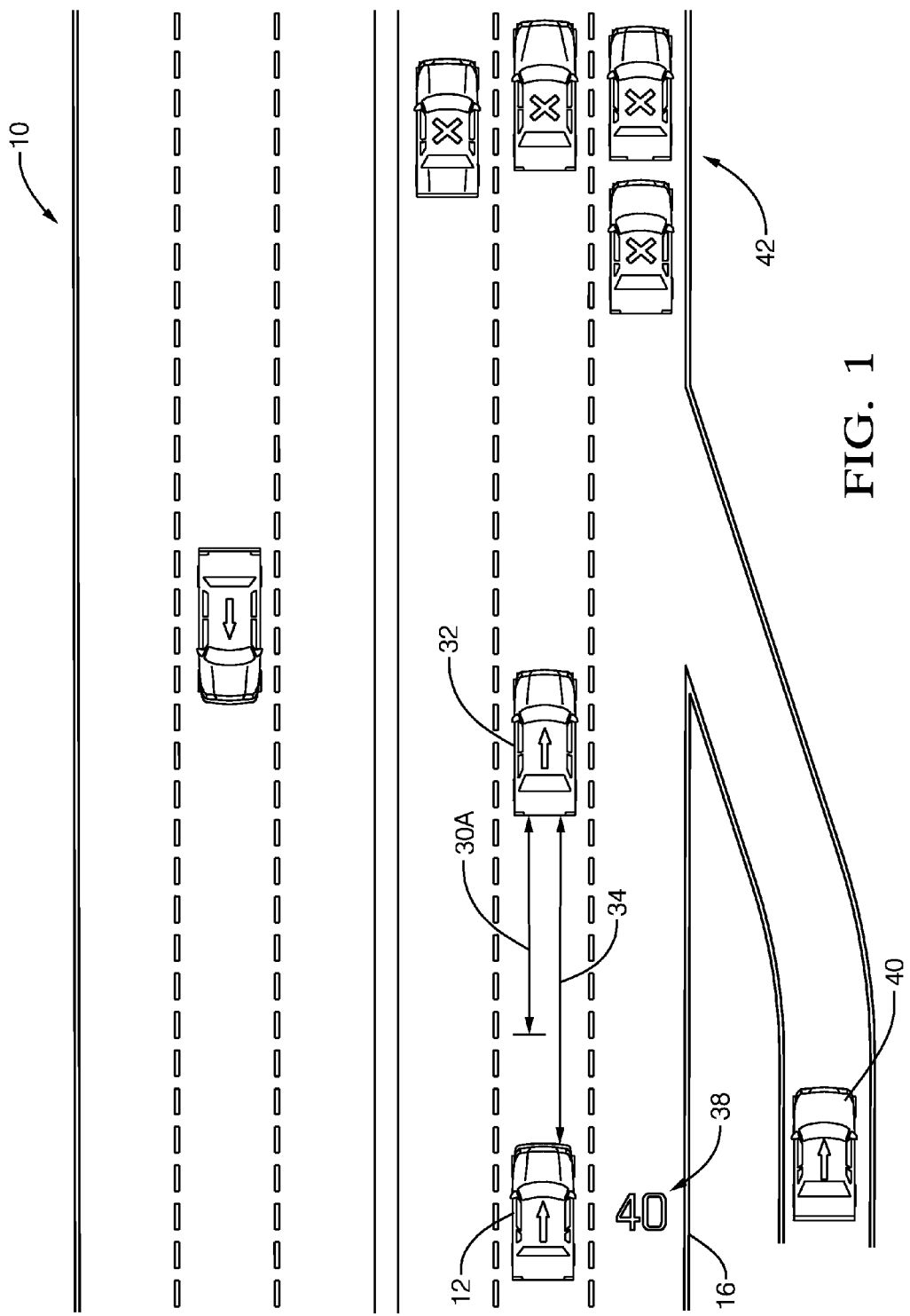
FIG. 1 is traffic scenario traveled by a host-vehicle equipped with a system for automated operation of the host-vehicle in accordance with one embodiment.
Figure 2:
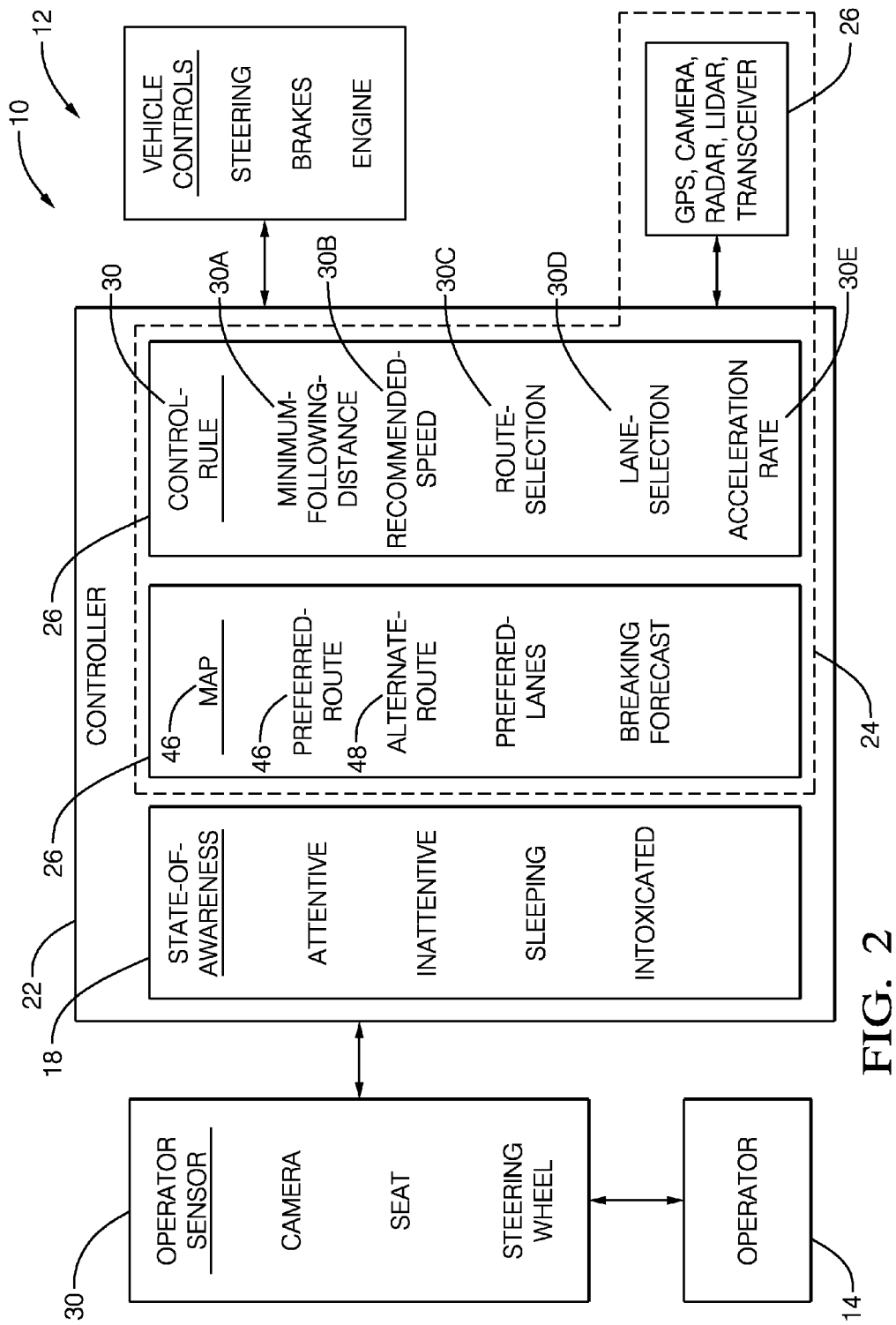
FIG. 2 is a diagram of the system of FIG. 1 in accordance with one embodiment.

FIGS. 1 and 2 illustrate a non-limiting example of a system 10 for automated operation of a host-vehicle 12. The system 10 may be configured for full-automation where an operator 14 (FIG. 2) of the host-vehicle 12 is little-more involved with operating the host-vehicle 12 than would be a passenger (not shown) residing in a rear seat of the host-vehicle 12. Alternatively, the system 10 may be configured for partial automation where, for example, only the speed of the host-vehicle 12 is controlled, which may or may not include automated operation of the brakes on the host-vehicle 12, and the steering of the host-vehicle 12 is the responsibility of the operator. While varying degrees or levels of autonomous or automated operation are contemplated, the teachings presented herein are especially useful for fully-automated operation of the host-vehicle 12.

As will become apparent in the description of the system 10 that follows, the system 10 described herein is an improvement over automated or autonomous vehicle systems previously described because the system 10 determines how to negotiate or travel a roadway 16 based on, among other things, a state-of-awareness 18 of the operator 14. While the roadway 16 is illustrated as having multiple lanes for travel in each of opposite directions, it is contemplated that the teachings presented herein are applicable to roadways that have any number of lanes and/or instances where all of the lanes are for travel in the same direction.

Referring now to FIG. 2, the system 10 includes an operator sensor, hereafter referred to as the sensor 20, which is installed in the host-vehicle 12. The sensor 20 is generally useful or operable to determine the state-of-awareness 18 of the operator 14 of the host-vehicle 12. Many techniques to determine the state-of-awareness of a vehicle operator have been proposed, as will be recognized by those in the art. For example, the sensor 20 may include a camera used to capture images to determine the operator's posture, respiration rate, and/or determine if the operator's eyes are open. Also, the seat in the host-vehicle may be equipped to determine if the operator is sitting squarely upon the seat, or is reclined or sitting sideways, which may be construed as indicating that the operator is not attentive to the operation of the host-vehicle 12. Another alternative includes configuring the steering wheel of the host-vehicle 12 to detect when the operator 14 is touching the steering wheel, and/or imparting steering torque to the steering wheel, which may be construed as indicating that the operator is attentive to the operation of the host-vehicle 12.

The sensor 20 may communicate information about the operator 14 to a controller 22 configured to process such information in order to determine the state-of-awareness 18. The controller 22 may include a processor (not specifically shown) such as a microprocessor or other control circuitry such as analog and/or digital control circuitry including an application specific integrated circuit (ASIC) for processing data as should be evident to those in the art. The controller 22 may include memory, including non-volatile memory, such as electrically erasable programmable read-only memory (EEPROM) for storing one or more routines, thresholds and captured data. The one or more routines may be executed by the processor to perform steps for determining if signals received from the sensor 20 indicate that the state-of awareness 18 of the operator 14 is attentive, or exhibits varying degrees of not being attentive such as inattentive, sleeping, or intoxicated.

The system 10 also includes a data-source 24 that provides route-data 26 used for automated operation of the host-vehicle 12. The data-source 24 may be stored in the controller 22 using known forms of memory, or data may be received from external-sources such as: a global-positioning system (GPS), a camera with a view of the area about the host-vehicle 12 and operable to gather information from road signs, radar and/or lidar units that detect objects about the host-vehicle 12, or a transceiver that provides route-data 26 via wireless communication with, for example, other vehicles (V2V) or the internet (V2X). The route-data 26 includes, but is not limited to, a map 28 of a roadway traveled by the host-vehicle 12, e.g. a map of the roadway 16, and a control-rule 30 for navigating the roadways described by the map 28. As used herein, the control-rule 30 generally specifies rules or guidelines for how the system 10, or more specifically the controller 22, is supposed to operate the host-vehicle 12 in various traffic scenarios. The various information shown as being associated with the map 28 and the control-rule 30 may be recalled from memory accessed by the controller 22, or may be derived from information provided various external sources (e.g. GPS, camera, radar, lidar, transceiver) as described above. It is contemplated that the map 28 may only be based on information derived from external sources such as the camera, and not based on previously stored map information as is customary for typical navigation devices. That is, the map 28 may consist only of an image of the roadway 16 forward of the host-vehicle 12, and the delineations of the roadway on the map may merely be the edges of the roadway 16 or lane-markings present on the roadway 16 detected by the camera.

By way of further example and not limitation, the control-rule 30 may include: a minimum-following-distance 30A for a particular roadway or a particular section of the roadway 16, a recommended-speed 30B such as a legal-speed limit for a particular roadway or a particular section of the roadway 16; rules or guidelines for a route-selection 30C and/or a lane-selection 30D; and a preferred value of an acceleration-rate 30E for accelerating from or to, for example, an intersection or traffic light.

In some situations during automated operation of the host-vehicle 12 while the operator 14 is attentive, the control-rule 30 may be suitable. However, if the operator 14 is not attentive, e.g. the operator 14 is sleeping, it may be preferable to modify the control-rule 30 to, for example, provide a smoother, steadier ride so as to not disturb the sleeping of the operator 14. The modification of the control-rule 30 may, as an unintended consequence, allow more time for the operator 14 to wake-up and become attentive if it is necessary for the operator 14 to manually operate the host-vehicle 12. That is, modifying or changing the control-rule 30 is not comparable to simply changing the amount of wake-up time allotted if the operator 14 is not attentive. Rather, the controller 22 is configured to operate the host-vehicle 12 during automated operation of the host-vehicle 12 in accordance with the route-data 26 which includes the map 28 and the control-rule 30 while the operator 14 is attentive, and if the operator 14 is not attentive the controller 22 is configured to modify the control-rule 30 based on the state-of-awareness 18 of the operator 14.

It is emphasized that the route-data 26, in particular the control-rule 30, is directed to the operation of the host-vehicle 12, as will become more apparent in the description of various examples given below. As such, it is also emphasized that modifying a control-rule 30 such as the minimum-following-distance 30A, the recommended-speed 30B, and the like, is not comparable to simply alerting the operator 14 sooner or more vigorously if the operator is sleeping and manual control of the host-vehicle 12 is desired. In other words, the system 10 described herein is an improvement over automated vehicle systems that merely vary the advanced warning time and/or the loudness of the advanced warning base on the state-of-awareness 18 of the operator 14.

Referring again to FIG. 1, the non-limiting example depicted shows the host-vehicle following an other-vehicle 32 on the roadway 16. As suggested above, the control-rule 30 may include or specify the minimum-following-distance 30A between the host-vehicle 12 and the other-vehicle 32 forward of the host-vehicle 12. The specified value of the minimum-following-distance 30A may be suitable when the operator 14 is attentive and may prefer to risk or sacrifice ride smoothness in exchange for reaching a destination as quickly as possible. However, if the operator 14 is sleeping, it may be preferable to follow the other-vehicle 32 at an increased or greater distance in order to provide the operator 14 a smoother ride by being less susceptible to sudden changes in speed by the other-vehicle 32. That is, the controller 22 may be configured to follow the other-vehicle 32 at a following-distance 34 that is greater than the minimum-following-distance 30A when the state-of-awareness 18 is something other than attentive, i.e. not attentive. With the greater following-distance, the host-vehicle 12 can likely use softer and/or less frequent braking to avoid colliding with the other-vehicle 32. A smoother ride may also be desirable if the operator is inattentive because the operator 14 is, for example, reading a book while traveling in the host-vehicle 12 as a smoother ride is less likely to cause motion-sickness while reading a book.

By way of another example, the control-rule 30 may specify a recommended-speed 30B when the state-of-awareness 18 is attentive. The recommended-speed 30B may be based on a posted speed-limit 38, and may be adjusted for weather and/or traffic conditions. However, if the operator 14 is sleeping, it may be preferable if the controller 22 operates the host-vehicle 12 at a vehicle-speed less than the recommended-speed when the state-of-awareness is not attentive. As will be recognized by any who drive a vehicle, operating at a slower speed generally provides for a smoother ride by being less affected by, for example, sudden changes in speed by the other-vehicle 32. That is, the controller 22 may be configured to travel at less than the posted speed-limit 38 when the state-of-awareness 18 is something other than attentive, i.e. not attentive.

Similarly, the control-rule 30 may specify an acceleration-rate 30E for passing the other-vehicle 32 or accelerating back to a desired speed if the other-vehicle 32 does something that caused the host-vehicle 12 to apply brakes or otherwise travel at a reduced speed. The acceleration-rate 30E may be used when the state-of-awareness 18 is attentive, but is may be preferable if the controller 22 accelerates the host-vehicle 12 at less than the acceleration-rate 30E when the state-of-awareness 18 is not attentive, e.g. is sleeping or reading a book.

In another embodiment of the system 10, the control-rule 30 may specify that all available lanes may be used when the state-of-awareness 18 is attentive, i.e. a lane-selection 30D is set to 'ALL', and the controller 22 steers the host-vehicle into preferred-lanes indicated by the map 28 when the state-of-awareness 18 is not attentive. For example, if the operator 14 is sleeping or reading a book, a smoother ride may be achieved by staying in the left or center lanes of the roadway 16, and avoiding the right lane so as to avoid having to changed speed or change lanes to make room for an entering-vehicle 40 entering the roadway 16 via an entrance ramp.

The map 28 may also specify a braking forecast for the roadway 16 that indicates locations on the roadway where braking of the host-vehicle 12 is expected. For example, the roadway 16 may include a toll-booth (not shown) where stopped-vehicles 42 may accumulate and require the host-vehicle 12 apply brakes. If the operator 14 is attentive, the controller 22 may apply brakes in accordance with the braking forecast. However, if the operator 14 is sleeping or reading a book so a smoother ride is desired, the controller 22 may apply brakes sooner than in accordance with the braking forecast.

Figure 3:
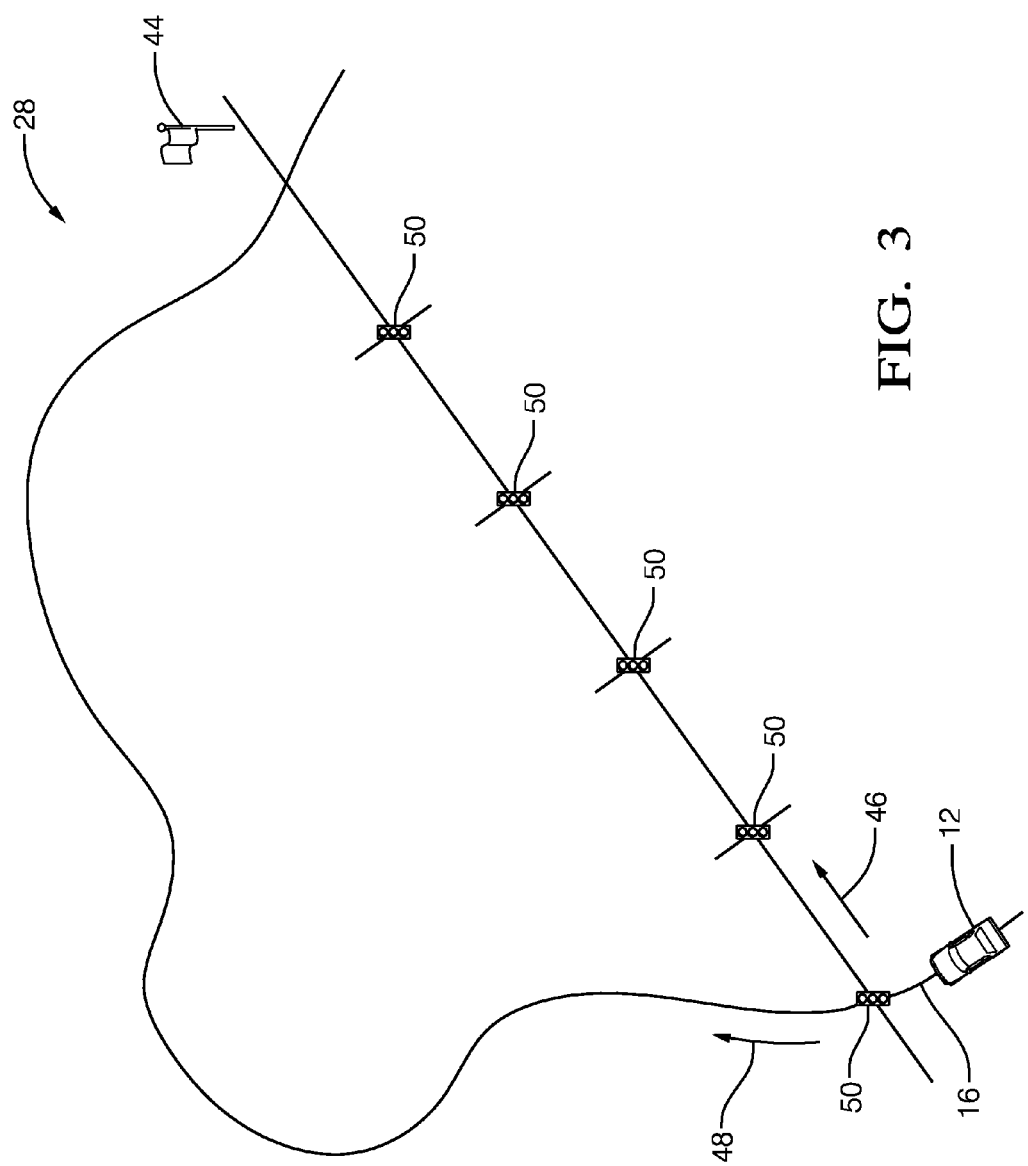
FIG. 3 is another traffic scenario traveled by a host-vehicle equipped with the system if FIG. 1 in accordance with one embodiment.

FIG. 3 illustrates a non-limiting example of a map 28 with the host-vehicle 12 traveling toward a destination 44. The route-data 26 includes a preferred-route 46 that may be selected or specified by the route-selection 30C of the control-rule 30 when the state-of-awareness 18 is attentive because it is the shortest and quickest route to the destination 44, even though the preferred-route 46 encounters several traffic lights 50. However, if the operator 14 is sleeping or reading a book, the route-selection 30C may specify or select an alternate-route 48 when the state-of-awareness is not attentive in order to provide a smoother ride because there are no traffic lights, even though it is longer and is expected to take more time.

Accordingly, a system 10 for automated operation of a host-vehicle 12 and a controller 22 for the system 10 is provided. If an operator 14 of the host-vehicle 12 is reading a book or sleeping, or otherwise doing something that would benefit from a smoother ride or smoother transportation experience, the system 10 or the controller 22 makes adjustments or modifications to one or more of the control-rule 30 to provide that smoother ride. That is, the system 10 changes or modifies one or more vehicle control parameters based on the state-of-awareness 18 of the operator 14. While this is a significant benefit by itself, a secondary benefit is that by adjusting or modifying the control-rule 30 as described herein, the operator 14 may be afforded more time to, for example, wake-up and be prepared to take manual control of the host-vehicle 12.

While this invention has been described in terms of the preferred embodiments thereof, it is not intended to be so limited, but rather only to the extent set forth in the claims that follow.

We claim:

1. A system for changing from automated operation of a host-vehicle to manual control of the host-vehicle by an operator, said system comprising:

a sensor installed in a host-vehicle, said sensor operable to determine a state-of-awareness of an operator of the host-vehicle, said state-of-awareness indicative of how much time is needed for the operator to become prepared to take manual control of the host-vehicle;

a data-source that provides route-data used for automated operation of the host-vehicle, wherein said route-data includes a map and a control-rule for automated operation of the host-vehicle while navigating the map when state-of-awareness of the operator is attentive; and a controller in communication with the sensor and the data-source, said controller configured to operate the host-vehicle during automated operation of the host-vehicle in accordance with the route-data, wherein the controller is configured to modify the control-rule when the state-of-awareness of the operator is not attentive.

2. The system in accordance with claim 1, wherein the control-rule specifies a minimum-following-distance between the host-vehicle and an other-vehicle forward of the host-vehicle, and the controller follows the other-vehicle at a following-distance greater than the minimum-following-distance when the state-of-awareness is not attentive.

3. The system in accordance with claim 1, wherein the control-rule specifies a recommended-speed when the state-of-awareness is attentive, and the controller operates the host-vehicle at a vehicle-speed less than the recommended-speed when the state-of-awareness is not attentive.

4. The system in accordance with claim 1, wherein the control-rule specifies an acceleration-rate when the state-of-awareness is attentive, and the controller accelerates the host-vehicle at less than the acceleration-rate when the state-of-awareness is not attentive.

5. The system in accordance with claim 1, wherein the control-rule specifies that all available lanes may be used when the state-of-awareness is attentive, and the controller steers the host-vehicle into preferred-lanes when the state-of-awareness is not attentive.

6. The system in accordance with claim 1, wherein the control-rule specifies a preferred-route when the state-of-awareness is attentive, and an alternate-route when the state-of-awareness is not attentive.

* * * * *